US005895839A

United States Patent [19]

Takahashi et al.

[11] Patent Number: 5,895,839

[45] Date of Patent: Apr. 20, 1999

[54] COMBUSTION STATE DETECTING APPARATUS FOR AN INTERNAL-COMBUSTION ENGINE

[75] Inventors: Yasuhiro Takahashi; Wataru Fukui, both of Tokyo, Japan

[73] Assignee: Mitsubishi Denki Kabushiki Kaisha, Tokyo, Japan

[21] Appl. No.: 08/891,034

[22] Filed: Jul. 10, 1997

[30] Foreign Application Priority Data

Feb. 18, 1997 [JP] Japan .................................... 9-033964

[51] Int. Cl.[6] .......................... G01M 15/00; F02P 17/00; G01L 23/00

[52] U.S. Cl. .......................... 73/35.08; 73/116; 324/378; 123/425

[58] Field of Search .................................... 73/116, 117.3, 73/35.08; 324/378, 393, 380; 123/425, 435, 419, 459

[56] References Cited

U.S. PATENT DOCUMENTS

| | | | |
|---|---|---|---|
| 5,207,200 | 5/1993 | Iwata | 73/35 |
| 5,230,240 | 7/1993 | Ohsawa | 73/116 |
| 5,272,914 | 12/1993 | Murata et al. | 73/116 |
| 5,321,978 | 6/1994 | Brandt et al. | 73/116 |
| 5,424,647 | 6/1995 | Ohsawa et al. | 73/35 |
| 5,675,072 | 10/1997 | Yasuda et al. | 73/45.08 |
| 5,694,900 | 12/1997 | Morita et al. | 73/35.08 |
| 5,747,670 | 5/1998 | Takahashi et al. | 73/35.08 |

*Primary Examiner*—Hezron Williams
*Assistant Examiner*—Helen C. Kwok
*Attorney, Agent, or Firm*—Sughrue, Mion, Zinn Macpeak & Seas, PLLC

[57] ABSTRACT

An combustion state detecting apparatus for an internal-combustion engine is provided for preventing control errors and detection errors by preventing a biasing circuit from discharging at the start of energization, thereby allowing good sensitivity for detecting ionic current to be maintained. The combustion state detecting apparatus comprises an ionic current detecting circuit which includes a biasing circuit connected to the low voltage end of a secondary winding of an ignition coil and which detects ionic current flowing from the biasing circuit via a spark plug after the combustion of a fuel-air mixture. A current limiting circuit is provided between the low voltage end of the secondary winding and the biasing circuit. An electronic control unit detects the combustion state at the spark plug according to the ionic current. The biasing means circuit applies a bias voltage of the opposite polarity from high voltage for ignition to the spark plug via the low voltage end of the secondary winding; and the current limiting means controls the current flowing from the biasing means to the spark plug via the secondary winding, thus restraining the voltage at the high voltage end of the secondary winding when starting current supply to a primary winding.

4 Claims, 7 Drawing Sheets

COMBUSTION STATE DETECTING APPARATUS FOR AN INTERNAL-COMBUSTION ENGINE

BACKGROUND OF THE INVENTION

1. Field of the Invention

The present invention relates to a combustion state detecting apparatus for detecting the combustion state of an internal-combustion engine by detecting the changes in the quantity of ions observed during the combustion in the internal-combustion engine and, more particularly, to a combustion state detecting apparatus for an internal-combustion engine which is capable of preventing pre-ignition or a drop in bias voltage at the time of energizing an ignition coil so as to obviate control errors and to ensure sound bias voltage for detecting ion current especially in an internal-combustion engine of low voltage distribution.

2. Description of Related Art

Generally, in an internal-combustion engine driven by a plurality of cylinders, a fuel-air mixture composed of fuel and air which has been introduced into the combustion chamber of each cylinder is compressed as a piston moves up, and high voltage for ignition is applied to a spark plug installed in the combustion chamber to generate an electric spark so as to burn the fuel-air mixture; the explosive force produced when the fuel-air mixture is burnt is converted to the force which pushes the piston down is taken out as a rotary output of the internal-combustion engine.

It is known that, when the combustion takes place in the combustion chamber, the molecules in the combustion chamber are ionized, and therefore, applying bias voltage to ionic current detecting electrodes, which are usually spark plug electrodes and which are installed in the combustion chamber, causes ions with electric charges to move in the form of ionic current between spark plug electrodes.

It is also known that the ionic current sensitively reacts to the combustion state in the combustion chamber, making it possible to detect a combustion state in the internal-combustion engine by detecting the state in which the ionic current is generated.

This type of combustion state detecting apparatus for an internal-combustion engine is described in, for example, Japanese Unexamined Patent Publication No. 4-191465 wherein a spark plug is employed as an electrode for detecting ionic current, and a combustion failure including a misfire is detected from the quantity of ionic current detected immediately after ignition.

FIG. 8 is a circuit configuration diagram illustrative of an example of a conventional combustion state detecting apparatus for an internal-combustion engine based on low voltage distribution.

In FIG. 8, the cathode of an in-car battery 1 is connected to one end of a primary winding 2*a* of an ignition coil 2, the other end of the primary winding 2*a* being connected to the ground via an emitter-grounded power transistor 3 for cutting off the supply of primary current.

A secondary winding 2*b* of the ignition coil 2 constitutes, together with the primary winding 2*a*, a transformer; the high voltage end of the secondary winding 2*b* is connected to one end of a spark plug 4 corresponding to each cylinder, not shown, to output high voltage of negative polarity at the time of ignition control.

The spark plug 4 composed of opposed electrodes discharges to ignite the fuel-air mixture in a cylinder when the high voltage for ignition is applied thereto.

In this drawing, only a pair of the ignition coil 2 and the spark plug 4 are shown as a representative of those ignition coils 2 and spark plugs 4 which are provided for respective cylinders.

The low voltage end of the secondary winding 2*b* is connected to an ionic current detecting circuit 10. The ionic current detecting circuit 10 applies a bias voltage of positive polarity, which is the opposite polarity from the ignition polarity, to the spark plug 4 via the secondary winding 2*b* and it detects the ionic current which corresponds to the quantity of ions generated at the time of combustion.

The ionic current detecting circuit 10 includes: a biasing means, namely, a capacitor C connected to the low voltage end of the secondary winding 2*b*; a diode D inserted between the capacitor C and the ground; a resistor R connected in parallel to the diode D; and a zener diode DZ for limiting voltage which is connected in parallel to the capacitor C and the diode D.

The series circuit composed of the capacitor C and the diode D and the zener diode DZ connected in parallel to the series circuit are inserted between the low voltage end of the secondary winding 2*b* and the ground to constitute a charging path for charging the capacitor C with the bias voltage at the time when ignition current is produced.

The capacitor C is charged with the secondary current which flows via the spark plug 4 discharged under the high voltage output from the secondary winding 2*b* when the power transistor 3 is turned OFF, i.e. when the current supplied to the primary winding 2*a* is cut off. The charging voltage is limited to a predetermined bias voltage, e.g. a few hundred volts, by the zener diode DZ; it functions as the biasing means, i.e. the power supply, for detecting ionic current.

The resistor R in the ionic current detecting circuit 10 converts the ionic current provided by the bias voltage to a voltage which is supplied as an ionic current detection signal Ei to an electronic control unit (ECU) 20.

The ECU 20 comprised of a microprocessor determines the combustion state of the internal-combustion engine according to the ionic current detection signal Ei; if it detects a bad combustion state, then it carries out appropriate corrective measures to prevent a problem.

The ECU 20 also computes the ignition timing, etc. according to the operating conditions obtained through various sensors, not shown, and issues an ignition signal P for the power transistor 3, fuel injection signals to the injectors, not shown, of the respective cylinders, and driving signals to various actuators such as a throttle valve and an ISC valve.

FIG. 9 through FIG. 11 are explanatory drawings illustrative of the path along which current flows into the secondary winding 2*b* and the ionic current detecting circuit 10; FIG. 9 and FIG. 10 illustrate the path, which is indicated by the solid line, of secondary current I2 flowing under the high voltage at the time when the spark plug 4 discharges, that is, during the ignition control; and FIG. 11 illustrates the path, which is indicated by the dashed line, of ionic current i running under the bias voltage at the time when the ionic current is detected.

Referring now to FIG. 9 through FIG. 11, the operation of the conventional combustion state detecting apparatus for an internal-combustion engine shown in FIG. 8 will be described.

Normally, the ECU 20 computes the ignition timing, etc. according to operating conditions and applies the ignition signal P to the base of the power transistor 3 at a target control timing so as to turn the power transistor 3 ON/OFF.

Thus, the power transistor 3 cuts off the supply of the primary current flowing into the primary winding 2*a* of the ignition coil 2 in order to boost the primary voltage and to generate the high voltage, e.g. a few tens of kilovolts, for ignition at the high voltage end of the secondary winding 2*b*.

This secondary voltage is applied to the spark plug 4 in each cylinder to generate a discharge spark in the combustion chamber of the cylinder under ignition control, thereby burning the fuel-air mixture. At this time, if the combustion state is normal, then a predetermined quantity of ions are produced around the spark plug and in the combustion chamber.

The secondary current I2 triggered by the discharge of the spark plug 4 at the time of ignition flows along the path indicated by the solid line shown in FIG. 9 and charges the capacitor C, which provides the bias power supply, via the charging path in the ionic current detecting circuit 10.

Then, as soon as the bias voltage of the capacitor C exceeds the zener voltage of the zener diode DZ, the secondary current I2 flows along the path indicated by the solid line in FIG. 10, and the bias voltage of the capacitor C is limited by the zener voltage of the zener diode DZ. The bias voltage of the capacitor C is set to an arbitrary predetermined value by the circuit characteristic of the zener diode DZ.

The bias voltage thus charged in the capacitor C is applied to the spark plug 4 of a cylinder which has just been subjected to the ignition control, i.e. combustion, via the secondary winding 2*b*, causing the ionic current i, which corresponds to the quantity of ions produced at the time of combustion, flows as indicated by the dashed line in FIG. 11. At this time, the ions move between the electrodes of the spark plug 4, and the capacitor C discharges.

The ionic current i is detected as the ionic current detection signal Ei by the voltage drop across the resistor R. The ECU 20 determines the combustion state of each cylinder according to the ionic current detection signal Ei and computes appropriate control parameters such as ignition timings in accordance with the operating conditions and the combustion states as previously described.

When, however, the supply of current to the primary winding 2*a* of the ignition coil 2 is begun, the high voltage end of the secondary winding 2*b* develops a positive voltage, which is opposite from that at the time of ignition.

This voltage has the same polarity as the bias voltage; therefore, if the bias voltage is superimposed, then there is a danger that discharge may take place between the opposed electrodes of the spark plug 4.

If the discharge takes place at the spark plug 4 at the time of the start of energizing the ignition coil 2, then a control error due to pre-ignition occurs and also, the capacitor C in the ionic current detecting circuit 10 wastefully discharges.

Furthermore, the discharge of the capacitor C causes a drop in the bias voltage, resulting in deteriorated sensitivity for detecting the ionic current i, and the current at the time of the discharge is erroneously detected as the ionic current i.

Thus, the conventional combustion state detecting apparatus for an internal-combustion engine has been posing a problem in that control errors attributable to pre-ignition, deteriorated sensitivity for detecting ionic current, and detection errors cannot be prevented because no measures have been made against the discharge of the bias voltage which may occur at the start of energizing the ignition coil 2.

SUMMARY OF THE INVENTION

The present invention has been made with a view toward solving the problem described above, and it is an object of the invention to provide a combustion state detecting apparatus for an internal-combustion engine, which apparatus is capable of preventing a biasing means from discharging at the time when the supply of current to an ignition coil is begun so as to prevent control errors or detection errors and also capable of maintaining good sensitivity for detecting ionic current.

To this end, according to the present invention, there is provided a combustion state detecting apparatus for an internal-combustion engine, which apparatus is equipped with: an ignition coil composed of a transformer which has a primary winding and a secondary winding, and which generates a high voltage for ignition at the high voltage end of the secondary winding when the supply of current to the primary winding is cut off; a spark plug which is composed of opposed electrodes connected to the high voltage end of the secondary winding and which discharges under the application of the high voltage for ignition to ignite the fuel-air mixture in a cylinder of the internal-combustion engine; an ionic current detecting circuit which includes biasing means connected to the low voltage end of the secondary winding and which detects ionic current flowing from the biasing means via the spark plug after the combustion of the fuel-air mixture; current limiting means inserted between the low voltage end of the secondary winding and the biasing means; and an electronic control unit (ECU) which detects the combustion state at the spark plug according to the ionic current; wherein the biasing means applies a bias voltage, which has the opposite polarity from the high voltage for ignition, to the spark plug via the low voltage end of the secondary winding; and the current limiting means limits the current flowing from the biasing means to the spark plug via the secondary winding, thereby restraining the voltage developed at the high voltage end of the secondary winding at the time of starting the supply of current to the primary winding.

The current limiting means of the combustion state detecting apparatus for an internal-combustion engine in accordance with the present invention includes a resistor.

In a preferred form of the invention, the current limiting means of the combustion state detecting apparatus for an internal-combustion engine includes a rectifying means connected in parallel to the resistor. The rectifying means sets current in a forward direction, the current flowing via the secondary winding due to the discharge of the spark plug when the high voltage for ignition is applied so as to restrain the potential difference across the resistor during ignition control.

In another preferred form of the invention, the ignition coils and the spark plugs of the combustion state detecting apparatus for an internal-combustion engine are provided for the respective cylinders of the internal-combustion engine; the current limiting means and the ionic current detecting circuit are commonly connected to the low voltage end of the secondary winding of each ignition coil.

DESCRIPTION OF THE PREFERRED EMBODIMENTS

First Embodiment

A first embodiment of the present invention will be described with reference to the accompanying drawings.

Figure 1:
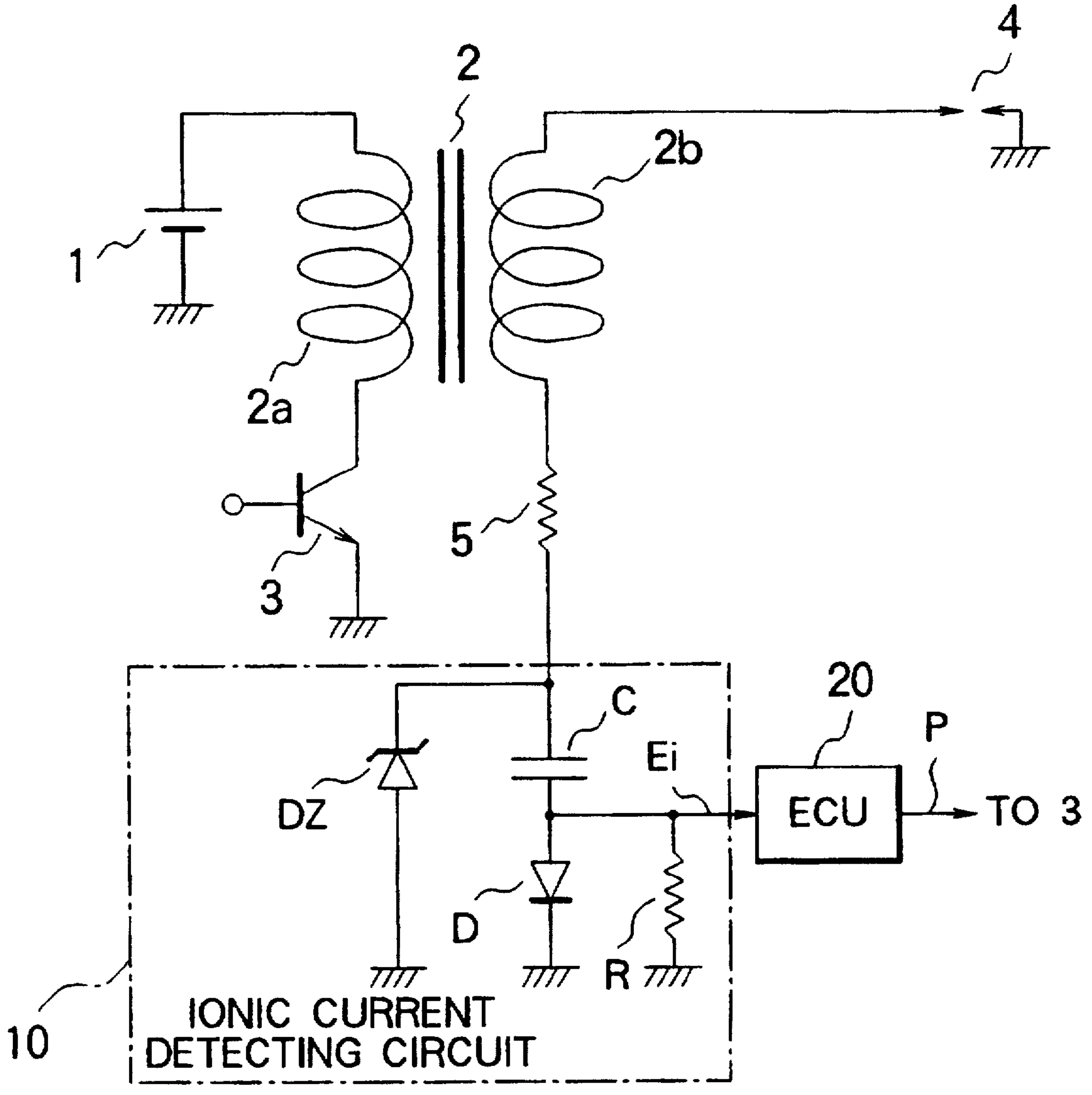
FIG. 1 is a circuit block diagram showing a first embodiment of the present invention.
Figure 8:
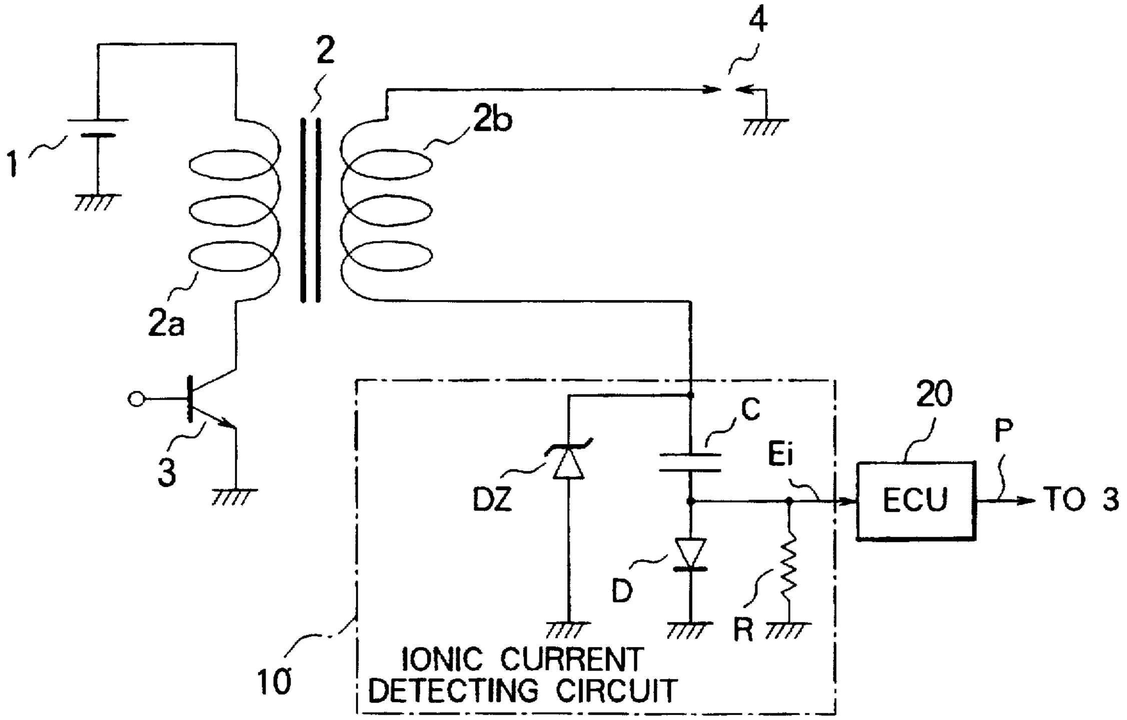
FIG. 8 PRIOR ART
FIG. 8 is a circuit block diagram illustrating a conventional combustion state detecting apparatus for an internal-combustion engine.
Figure 9:
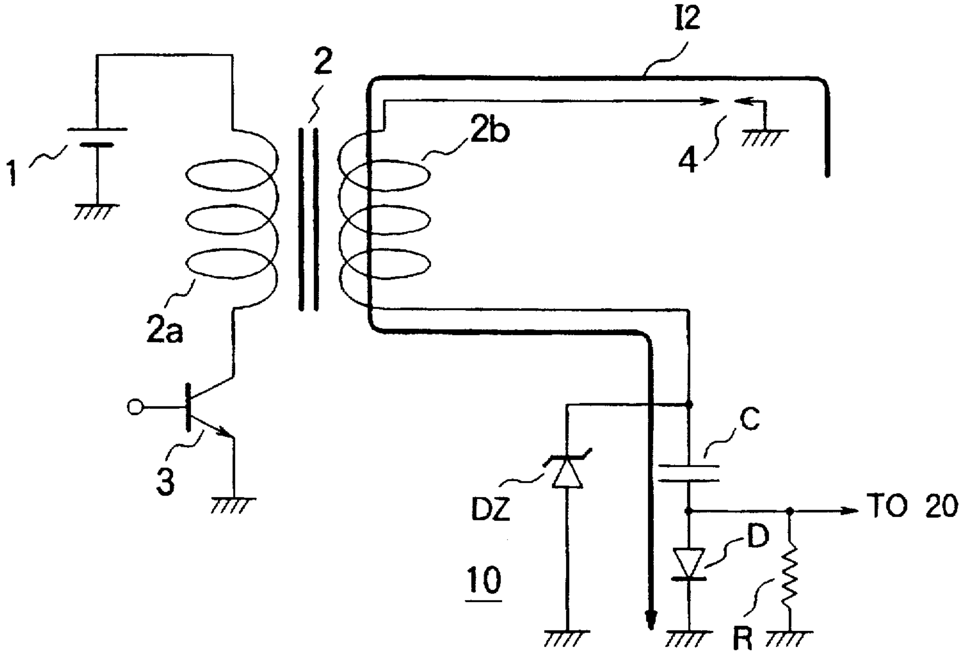
FIG. 9 PRIOR ART
FIG. 9 is an explanatory diagram illustrative of a secondary current path at the time of charging of a bias voltage by the conventional combustion state detecting apparatus for an internal-combustion engine.
Figure 10:
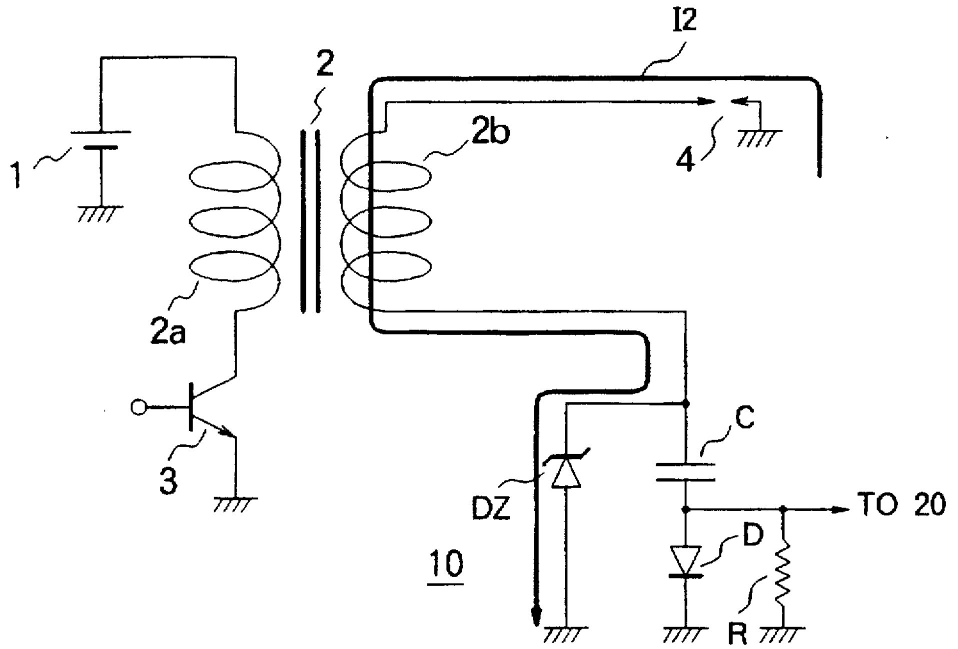
FIG. 10 PRIOR ART
FIG. 10 is an explanatory diagram illustrative of a secondary current path at the time of clamping of the bias voltage by the conventional combustion state detecting apparatus for an internal-combustion engine.
Figure 11:
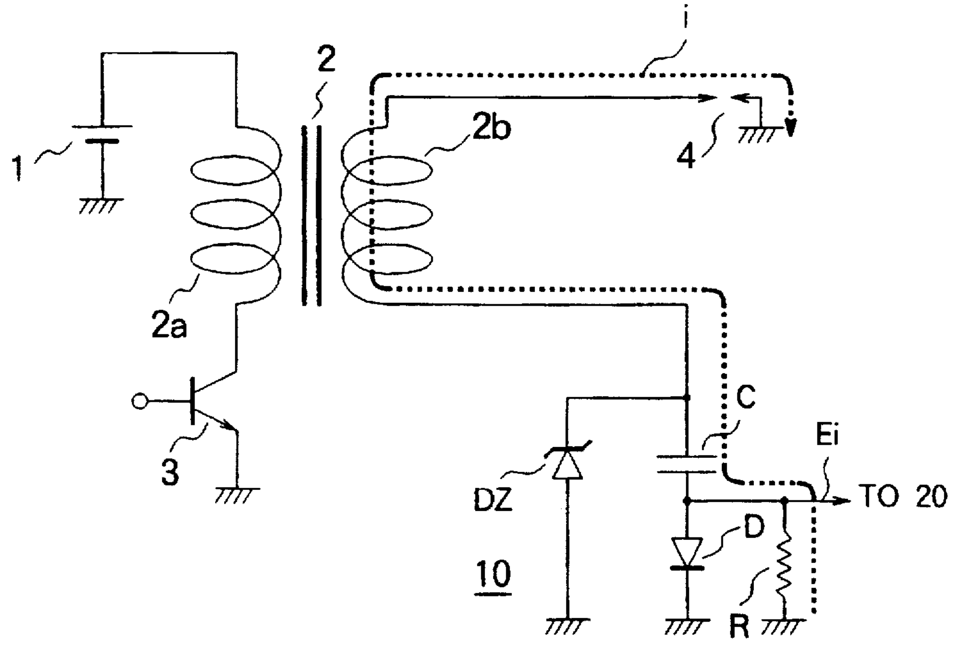
FIG. 11 PRIOR ART
FIG. 11 is an explanatory diagram illustrative of an ionic current path at the time of the detection of ionic current by the conventional combustion state detecting apparatus for an internal-combustion engine.

FIG. 1 is a block diagram illustrating the first embodiment of the invention; like components as those described above (see FIG. 8) will be assigned like reference numerals and the detailed description thereof will be omitted.

In FIG. 1, a resistor 5 functioning as a current limiting means is inserted between the low voltage end of a secondary winding 2*b* and a capacitor C, i.e. a biasing means, in the an ionic current detecting circuit 10.

The resistor 5 controls the discharge current flowing into a spark plug 4 via the secondary winding 2*b* from the capacitor C, thereby controlling the voltage developed at the high voltage end of the secondary winding 2*b* at the stat of the supply of current to a primary winding 2*a*.

This prevents the discharge from taking place between the electrodes of the spark plug 4 so as to prevent the discharge of the capacitor C serving as a biasing power supply, thereby obviating the deterioration in the sensitivity for detecting ionic current i.

Figure 2:
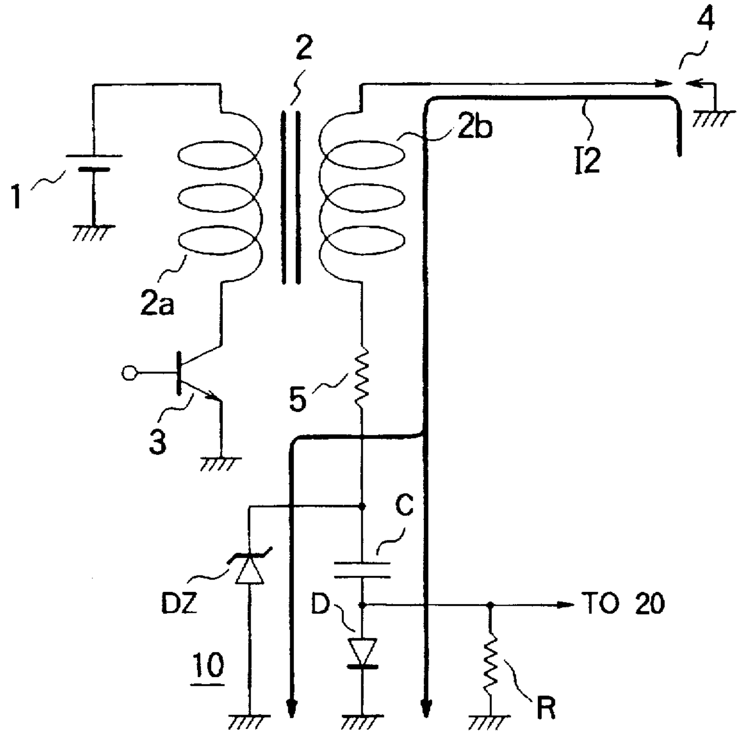
FIG. 2 is an explanatory diagram illustrative of a secondary current path at the time of ignition control according to the first embodiment of the invention.
Figure 3:
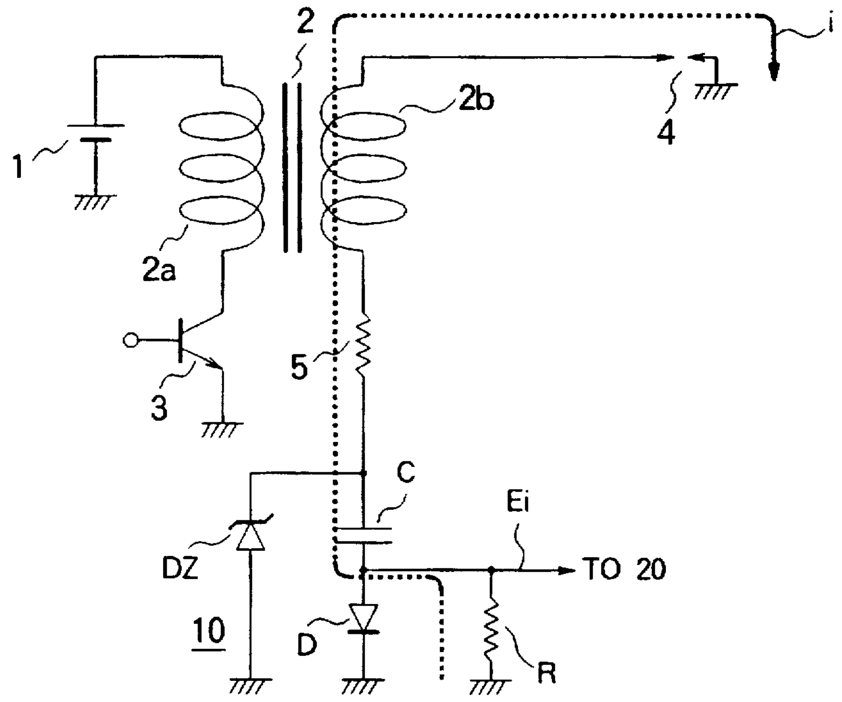
FIG. 3 is an explanatory diagram illustrative of an ionic current path at the time of the detection of the ionic current in accordance with the first embodiment of the invention.

FIG. 2 and FIG. 3 are explanatory diagrams illustrative of the paths along which current flows into the secondary winding 2*b* and the ionic current detecting circuit 10 via the resistor 5. Specifically, FIG. 2 shows the path, indicated by the solid line, of secondary current I2 which flows under the high voltage at the time of the discharge at the spark plug 4, i.e. at the time of ignition control; and FIG. 3 shows the path, indicated by the dashed line, of ionic current i which flows under the bias voltage at the time of the detection of the ionic current.

Referring to FIG. 2 and FIG. 3, the operation of the first embodiment of the invention shown in FIG. 1 will be described.

As previously mentioned, when a power transistor 3 is turned ON by an ignition signal P, the supply of current to primary winding 2*a* is begun and positive voltage appears at the high voltage end of the secondary winding 2*b*.

At this time, the discharge current from the capacitor C to the low voltage end of the secondary winding 2*b* is restricted by the resistor 5; therefore, the voltage developed at the secondary winding 2*b* is divided to the high voltage end and the low voltage end without the bias voltage being superimposed thereon.

Hence, the voltage which is generated at the high voltage end of the secondary winding 2*b* at the time of energizing the ignition coil 2 and which has the polarity opposite from the ignition polarity is suppressed, preventing the spark plug 4 from discharging.

As a result, the pre-ignition of the spark plug 4 is prevented, and the capacitor C does not discharge; therefore, the bias voltage can be maintained at a sound value, enabling good sensitivity for detecting the ionic current i to be maintained.

Then, when the power transistor 3 turns OFF to cut off the supply of the primary current, the high voltage for ignition appears at the high voltage end of the secondary winding 2*b*, and spark discharge takes place at the spark plug 4 of the cylinder under control, burning the fuel-air mixture.

The then secondary current I2 flows along the path indicated by the solid line in FIG. 2 and charges the capacitor C as mentioned above, the charging voltage being limited by the zener voltage of the zener diode DZ.

When the fuel-air mixture in the combustion chamber burns due to the discharge of the spark plug 4, ions are produced in the vicinity of the spark plug 4, causing the ionic current i indicated by the dashed line in FIG. 3 to flow, with the charging voltage of the capacitor C as the power supply.

This causes an ionic current detection signal Ei to be supplied from the resistor R to the ECU 20 which employs it to determine the combustion state.

Thus, the resistor 5 for limiting current which is installed between the secondary winding 2*b* and the capacitor C prevents the bias voltage of the capacitor C from being discharged to the spark plug 4 via the secondary winding 2*b* even when the positive voltage is produced at the high voltage end of the secondary winding 2*b* at the start of the supply of the primary current.

Hence, control errors or a drop in the bias voltage can be prevented, so that highly accurate ionic current detection signal Ei allows highly reliable determination result of the combustion state to be obtained.

Second Embodiment

In the first embodiment described above, only the resistor 5 has been used as the current limiting means; however, a rectifying means for setting secondary current I2 at the time of ignition control for the forward direction may be connected in parallel to the resistor 5.

In such a case, the current restricting function of the resistor 5 is rendered invalid with respect to the secondary current I2; therefore, the ignition characteristic does not deteriorate.

Figure 4:
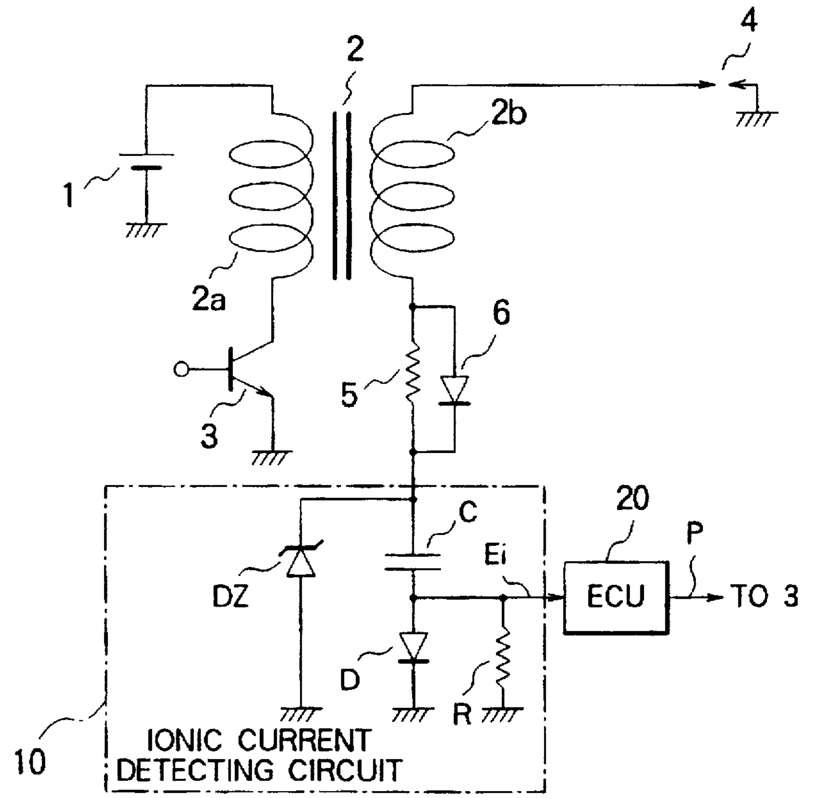
FIG. 4 is a circuit block diagram illustrating a second embodiment of the invention.

FIG. 4 is a circuit block diagram illustrating a secondary embodiment of the invention wherein the rectifying means is connected in parallel to the resistor 5; like composing elements as shown in FIG. 1 are given like reference numerals, and the detailed description thereof will be omitted.

Figure 5:
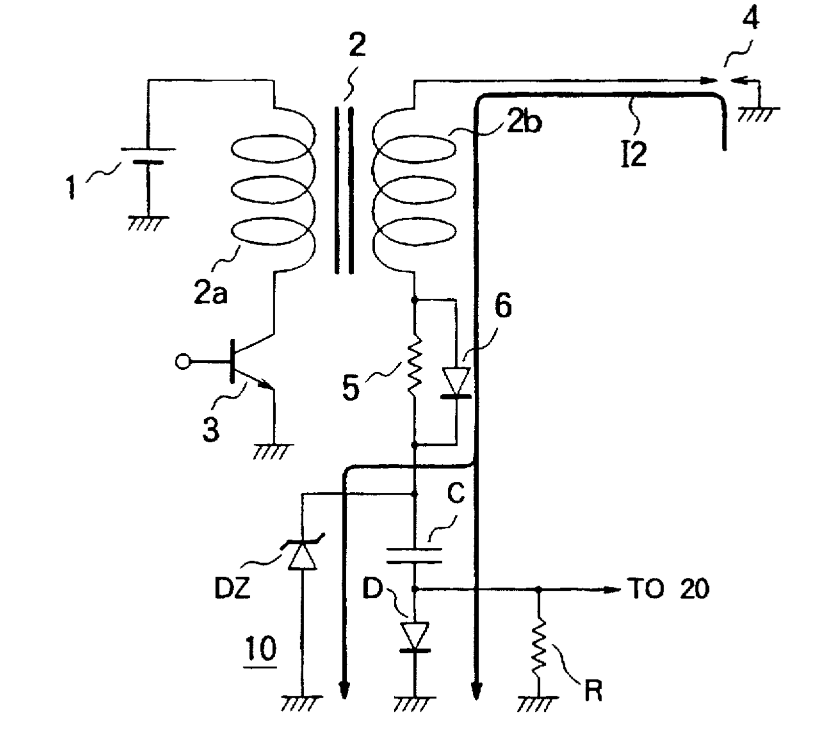
FIG. 5 is an explanatory diagram illustrative of a secondary current path at the time of ignition control according to the second embodiment of the invention.
Figure 6:
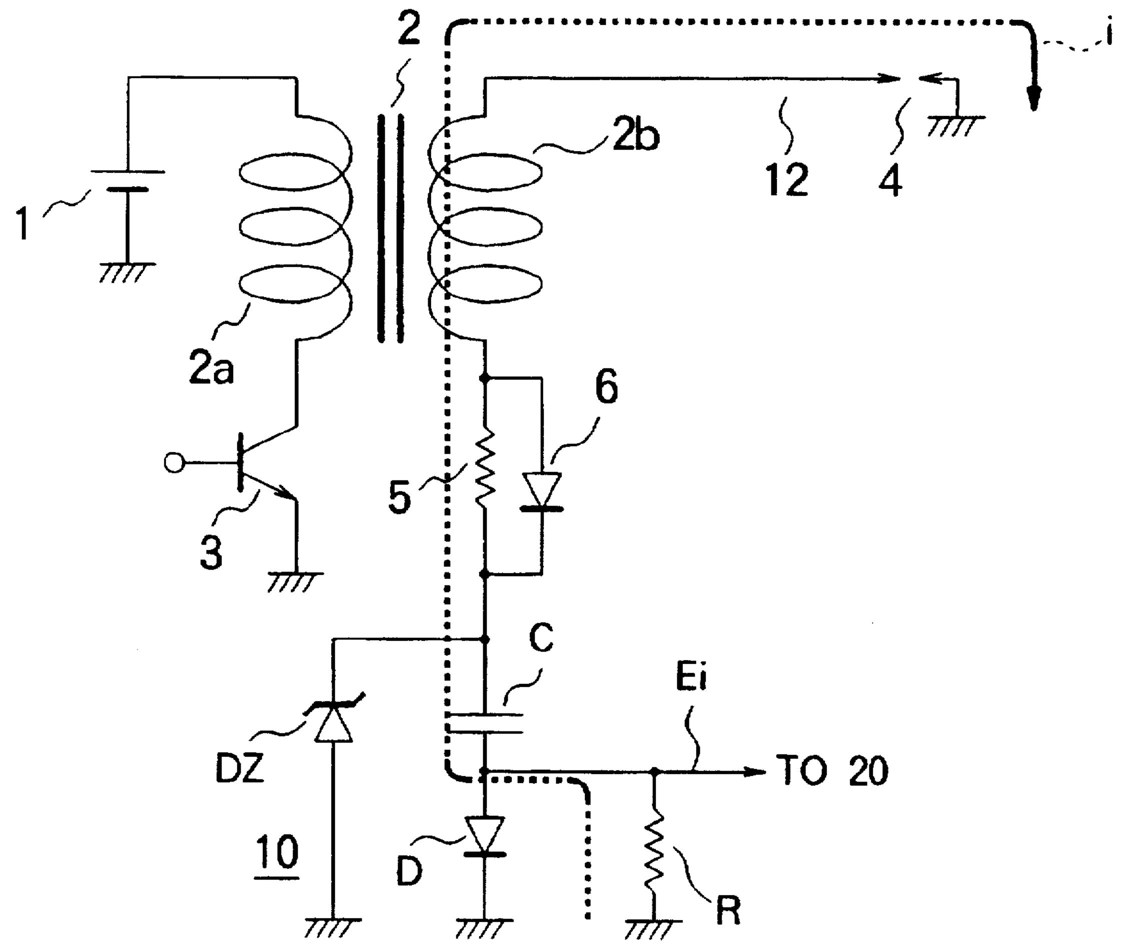
FIG. 6 is an explanatory diagram illustrative of an ionic current path at the time of the detection of the ionic current in accordance with the second embodiment of the invention.

FIG. 5 and FIG. 6 are explanatory diagrams showing the paths along which current flows into a secondary winding *2b* and an ion current detecting circuit 10 via the current limiting means. Specifically, FIG. 5 shows the path, indicated by the solid line, of secondary current I2 which flows under the high voltage at the time of the discharge at the spark plug 4, i.e. at the time of ignition control; and FIG. 6 shows the path, indicated by the dashed line, of ionic current i which flows under the bias voltage at the time of the detection of the ionic current.

In FIG. 4, the current limiting means is constituted by the resistor 5 and the rectifying means, namely, a diode 6 which is connected in parallel to the resistor 5.

The diode 6 is installed so that the secondary current I2 which flows when the high voltage for ignition is applied is in the forward direction to restrain the potential difference across the resistor 5 during ignition control.

Referring to FIG. 5 and FIG. 6, the operation of the second embodiment of the invention shown in FIG. 4 will be described.

First, even when positive voltage appears at the high voltage end of a secondary winding *2b* when the supply of current to the primary winding *2a* is begun, the positive voltage developed at the high voltage end of the secondary winding *2b* will be restricted, preventing the discharge at a spark plug 4 since the discharge current to the low voltage end of the secondary winding *2b* from the capacitor C is limited by the resistor 5 as mentioned above.

Hence, the pre-ignition of the spark plug 4 and the discharge of the capacitor C are prevented; therefore, the bias voltage of the capacitor C can be maintained at a sound value, enabling good sensitivity for detecting the ionic current i to be maintained.

Then, when the primary current is cut off, the high voltage for ignition is produced at the high voltage end of the secondary winding *2b* and the spark plug 4 discharges. This causes the secondary current I2 to flow along the path, indicated by the solid line in FIG. 5, via the diode 6 to charge the capacitor C to a predetermined voltage.

Further, the discharge of the spark plug 4 produces ions, and the ionic current i flows along the path, indicated by the dashed line in FIG. 6, via the resistor 5.

Thus, the diode 6 connected in parallel to the resistor 5 for limiting current causes the secondary current I2 to flow into the diode 6 without going through the resistor 5 during the ignition control as illustrated in FIG. 5.

Accordingly, the potential difference across the resistor 5 is reduced, permitting improved ignition performance in comparison with the aforesaid first embodiment.

At the start of supplying the primary current, the current limiting function of the resistor 5 is rendered effective, so that the current discharged from the capacitor C to the secondary winding *2b* is limited, making it possible to prevent control errors or a drop in the bias voltage as in the case of the first embodiment.

Third Embodiment

In the first and second embodiments above, the description has been given with only one spark plug 4 as a representative; it is needless to say, however, that the invention can be also applied to an internal-combustion engine apparatus having a plurality of ignition coils and a plurality of spark plugs for each cylinder.

In such a case, a single current limiting means and the single ionic current detecting circuit 10 can be commonly used for the plurality of ignition coils and spark plugs for each cylinder, so that no increase in cost will result.

Figure 7:
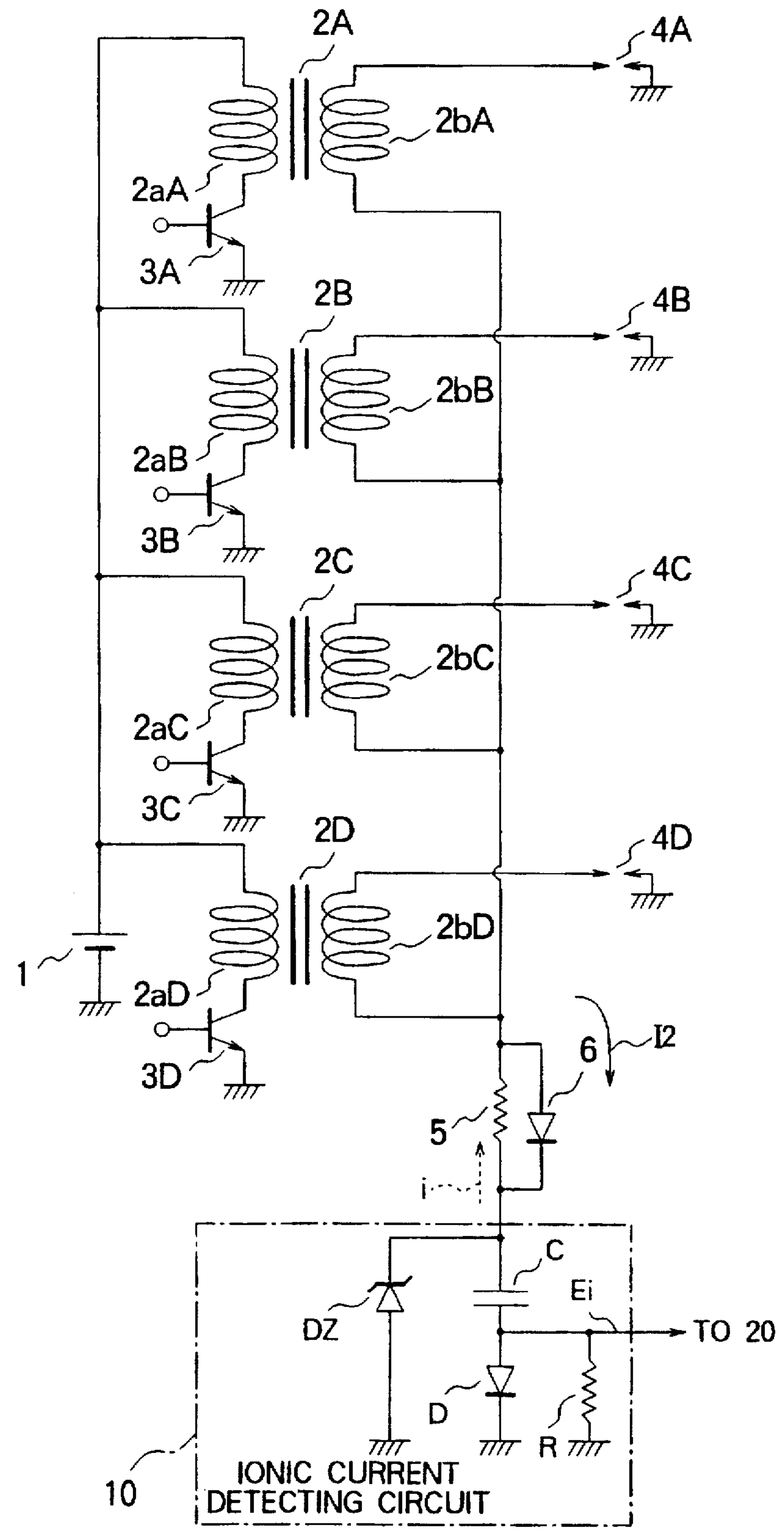
FIG. 7 is a circuit block diagram illustrating a third embodiment of the invention.

FIG. 7 is a circuit block diagram illustrating a third embodiment of the invention applied to a four-cylinder internal-combustion engine employing an independent ignition system; like component elements as those mentioned above will be assigned like reference numerals, and the detailed description thereof will be omitted.

In FIG. 7, ignition coils 2A through 2D provided for a plurality of cylinders (four cylinders in this embodiment) share the same construction; they have primary windings *2a*A through *2a*D and secondary windings *2b*A through *2b*D.

Likewise, spark plugs 4A through 4D provided in the combustion chambers of the respective cylinders are individually connected to the high voltage sides of the secondary windings *2b*A through *2b*D of the ignition coils 2A through 2D.

The cathode of a battery 1 is connected to one end of the primary windings *2a*A through *2a*D of the ignition coils 2A through 2D.

The other ends of the primary windings *2a*A through *2a*D of the ignition coils 2A through 2D are respectively connected to power transistors 3A through 3D.

The low pressure ends of the secondary windings *2b*A through *2b*D are commonly connected to a capacitor C and a zener diode DZ in the ionic current detecting circuit 10 via the single current limiting means composed of a parallel circuit of a resistor 5 and a diode 6.

The operation of the third embodiment of the invention shown in FIG. 7 will now be described.

For the purpose of simplicity, an example will be taken wherein the ignition control is performed through the spark plug 4A.

First, when an ignition signal P from an ECU 20 is applied to the base of the power transistor 3A, the power transistor 3A cuts off the supply of the primary current to the primary winding *2a*A of the ignition coil 2A.

When the power transistor 3A turns ON to start the supply of the primary current of the ignition coil 2A, voltage is generated at the secondary winding *2a*A, but the resistor 5 restricts the discharge current from the capacitor C to the secondary winding *2b*A, making it possible to suppress a drop in the voltage of the capacitor C as previously mentioned. Further, the voltage generated at the secondary winding *2b*A is controlled, enabling the prevention of pre-ignition at the spark plug 4A.

Then, when the primary current of the ignition coil 2A is cut off as the transistor 3A is turned OFF, high voltage appears at the high voltage end of the secondary winding *2b*A. This causes the spark discharge at the spark plug 4A to take place, burning the fuel-air mixture.

At that time, the secondary current I2 flows from the ground to the spark plug 4A, the secondary winding *2b*A, the diode 6, the capacitor C, diode D, and the ground in the order in which they are listed, thus charging the capacitor C with a predetermined bias voltage.

When the voltage of the capacitor C becomes equal to the zener voltage of the zener diode DZ, the secondary current I2 flows from the ground to the spark plug 4A, the secondary winding *2b*A, the diode 6, the zener diode DZ, the diode D, and the ground in the order in which they are listed. This completes the charging of the capacitor C, and the bias voltage is restricted by the zener voltage of the zener diode DZ.

When the fuel-air mixture in the cylinder corresponding to the spark plug 4A is burnt, the ions in the combustion chamber moves, using the charging voltage of the capacitor C as the power supply. As a result, ionic current i flows from the ground to a resistor R, the capacitor C, the resistor 5, a secondary winding 2*b*A, the spark plug 4A, and the ground in the order in which they are listed.

Just like the embodiments previously described, the resistor R applies current detection signal Ei to the ECU 20.

Thus, the single current limiting means and the ionic current detecting circuit 10 shared by the ignition coils 2A through 2D of a plurality of cylinders make it possible to obtain highly accurate ionic current detection signal Ei so as to ensure highly reliable determination of the combustion state of an internal-combustion engine without adding to cost.

What is claimed is:

1. A combustion state detecting apparatus for an internal-combustion engine, comprising:

an ignition coil comprising a transformer which has a primary winding and a secondary winding, and which generates a high voltage for ignition at a high voltage end of the secondary winding when the supply of current to the primary winding is cut off;

a spark plug comprising opposed electrodes connected to the high voltage end of the secondary winding and which discharges under the application of a high voltage for ignition to ignite the fuel-air mixture in a cylinder of the internal-combustion engine;

an ionic current detecting circuit comprising biasing means connected to a low voltage end of the secondary winding and which detects ionic current flowing from the biasing means via the spark plug after the combustion of the fuel-air mixture;

current limiting means disposed between the low voltage end of the secondary winding and the biasing means; and an electronic control unit (ECU) which detects the combustion state at the spark plug according to the ionic current;

wherein the biasing means applies a bias voltage, which has the opposite polarity from the high voltage for ignition, to the spark plug via the low voltage end of the secondary winding; and the current limiting means limits the current flowing from the biasing means to the spark plug via the secondary winding, thereby restraining the voltage developed at the high voltage end of the secondary winding at the time of starting the supply of current to the primary winding.

2. A combustion state detecting apparatus for an internal-combustion engine according to claim 1, wherein the current limiting means includes a resistor.

3. A combustion state detecting apparatus for an internal-combustion engine according to claim 2, wherein the current limiting means includes rectifying means connected in parallel to the resistor;

wherein the rectifying means sets current in a forward direction, which current flows via the secondary winding due to the discharge of the spark plug when the high voltage for ignition is applied so as to restrain the potential difference across the resistor during ignition control.

4. A combustion state detecting apparatus for an internal-combustion engine according to claim 1, wherein the ignition coil and the spark plug are provided for a cylinder of the internal-combustion engine; and the current limiting means and the ionic current detecting circuit are commonly connected to the low voltage end of the secondary winding of the ignition coil.

* * * * *